United States Patent [19]

Tow

[11] 4,385,208
[45] May 24, 1983

[54] MULTIFREQUENCY RECEIVER

[75] Inventor: Jimmy Tow, Holmdel, N.J.

[73] Assignee: Bell Telephone Laboratories, Incorporated, Murray Hill, N.J.

[21] Appl. No.: 254,442

[22] Filed: Apr. 15, 1981

[51] Int. Cl.³ .............................................. H04M 1/50
[52] U.S. Cl. ................................ 179/84 VF; 324/77 E
[58] Field of Search ................... 179/84 VF; 307/358; 324/77 B, 77 E, 77 F

[56] References Cited

U.S. PATENT DOCUMENTS

| | | | |
|---|---|---|---|
| 4,107,475 | 8/1978 | Carlqvist et al. | 179/84 VF |
| 4,121,121 | 10/1978 | Gabeler | 307/358 |
| 4,145,580 | 3/1979 | Hasegawa | 179/84 VF |
| 4,227,055 | 10/1980 | Hanson | 179/84 VF |

*Primary Examiner*—G. Z. Rubinson
*Assistant Examiner*—James L. Dwyer
*Attorney, Agent, or Firm*—Gregory C. Ranieri

[57] ABSTRACT

In a multifrequency receiver, a threshold level (VTH) supplied to a group of threshold comparators (105-1 through 105-N) is controllably adjustable by a variable threshold generation circuit (104) in response to received multifrequency signals. As the envelope of the received multifrequency signal experiences a positive amplitude transition, the threshold level is increased at a fast rate (fast attack). Also, as the envelope of the received multifrequency signal exhibits a negative amplitude transition, the threshold level is decreased at a much slower rate (slow release).

9 Claims, 5 Drawing Figures

MULTIFREQUENCY RECEIVER

TECHNICAL FIELD

This invention relates to signaling systems and, more particularly, to multifrequency signaling receivers.

BACKGROUND OF THE INVENTION

Multifrequency signaling is an inband interoffice address signaling method in which ten decimal digits and five auxiliary signals are each represented by a pair of signals selected from a group of at least six distinct tone frequency signals. This signaling method is now commonplace in communication systems. Multifrequency signaling is employed in subscriber signaling, signaling between central offices, intraoffice communications, remote control of other systems, control of remote test equipment, imputting data to computer systems, and the like. Consequently, it is increasingly important that detection of valid multifrequency signals be achieved accurately and inexpensively.

Multifrequency receivers utilize a plurality of narrow bandpass filters and a plurality of corresponding threshold comparators to detect valid multifrequency signals in a received signal. Threshold comparisons are performed with respect to either a fixed or variable threshold level. In the variable threshold level type of multifrequency receiver, the threshold level is dynamically generated in response to the received multifrequency signal. See, for example, U.S. Pat. No. 4,227,055 issued to R. L Hanson on Oct. 7, 1980. Each threshold level represents an instantaneous amplitude of the received signal. When the received signal ceases to be present, the threshold level returns to a predetermined quiescent level.

Each bandpass filter in the multifrequency receiver is characterized by a narrow passband centered about a particular tone frequency. To avoid erroneous detection of out-of-band signals, the bandpass filters are designed to have an extremely steep rolloff characteristic at the cutoff frequency.

One problem with prior multifrequency receivers which employ these bandpass filters in combination with a variable threshold level generation circuit is that transient disturbances in the nature of superimposed, damped oscillatory signals appear at the filter outputs following an abrupt input stimulus such as an on-off transition of the received signal or a burst of shot noise or the like while the variable threshold level is at or returning to the predetermined quiescent level. The magnitude of the disturbances exceeds the variable threshold level by an amount sufficient to cause the threshold comparators to indicate the presence of signal levels exceeding the threshold level. Hence, the multifrequency receiver erroneously detects the transient disturbances from the bandpass filters as a valid received multifrequency signal.

SUMMARY OF THE INVENTION

Transient disturbances and the like output from the bandpass filters in a multifrequency receiver are rejected as invalid multifrequency signals by controllably adjusting the variable threshold level. As the envelope of the received signal undergoes positive amplitude changes, the threshold level is increased at a fast rate. However, as the envelope of the received signal exhibits a negative amplitude change, the threshold level is decreased at a much slower rate. Thus, even after the received signal has ceased, the multifrequency receiver is capable of correctly distinguishing between the valid multifrequency signal and the transient disturbances output by the bandpass filters.

BRIEF DESCRIPTION OF THE DRAWINGS

A more complete understanding of the invention may be obtained by reading the following detailed description of specific illustrative embodiments of the invention in conjunction with the appended drawings in which.

DETAILED DESCRIPTION

Multifrequency signals are either analog or digital in nature. The reception of either type of signal is contemplated by the multifrequency receiver shown in FIGS. 1 through 5. In order to describe the embodiments shown in the figures in a clear and concise manner, it is assumed that the received multifrequency signals are analog signals.

Figure 1:
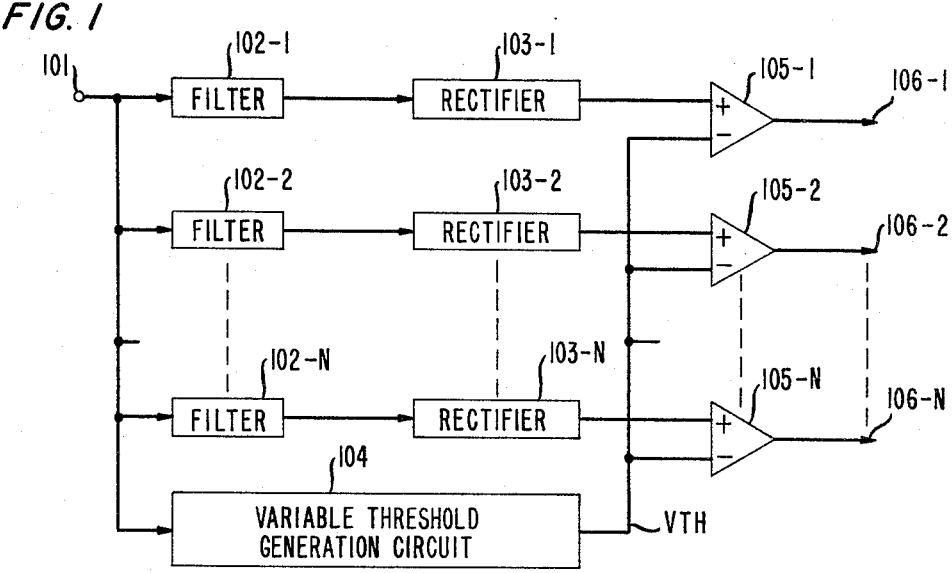
FIG. 1 shows in simplified block diagram form an arrangement for detecting reception of multifrequency signals.

FIG. 1 shows, in simplified block diagram form, a multifrequency receiver including one embodiment of the invention. The multifrequency receiver may be utilized as desired for detecting the reception of two-out-of-N multifrequency tones. Two-out-of-six multifrequency receivers are widely used in telecommunications systems.

The multifrequency receiver shown in FIG. 1 includes an arrangement for dynamically generating a threshold level in response to the received signal and a plurality of frequency sensitive comparator circuits, each responsive to a predetermined tone frequency and comprising a bandpass filter, a rectifier and a threshold comparator. Generally, the multifrequency receiver shown in FIG. 1 responds to the received multifrequency signal supplied via terminal 101 to generate pulse output signals at outputs 106-1 through 106-N representing the presence of tone signals in the received signal. The pulse width of each individual pulse output signal is representative of the percent duty cycle that the corresponding tone sigal exceeds the dynamically generated threshold level.

Received signals are supplied to the multifrequency receiver via terminal 101 and then distributed to bandpass filters 102-1 through 102-N and to variable threshold generation circuit 104. In prior arrangements, the received signal was supplied to an automatic gain control circuit. However, in this application, the need for an automatic gain control circuit is eliminated because the ratio of the variable threshold level to the peak signal output from the bandpass filters remains constant independent of the magnitude for the received signal.

Filters 102-1 through 102-N are bandpass filters, each capable of passing a distinct frequency tone signal employed in a telecommunications multifrequency signaling system, for example, a two-out-of-six multifrequency signaling system. Preferably, each filter includes two biquadratic active resistor-capacitor filters connected in cascade to realize a fourth order bandpass function. An example of one such active filter is described in U.S. Pat. No. 3,919,658 issued to J. J. Friend on Nov. 11, 1975. It should be apparent to those skilled in the art that the component values in the filters may be selected to get a desired bandpass characteristic. In one example from experimental practice, the attenuation versus frequency characteristic of the filters is selected so that the cross-over point in the response characteristics of adjacent filters, i.e., the attenuation at a frequency midway between the center frequencies of adjacent frequency bands, is at least $-11$ dB below a desired reference level, for example, 0 dB. By employing such a filter characteristic, filters 102-1 through 102-N further attenuate out-of-band signals, i.e., tone signals that are approximately midway between adjacent frequency bands, thereby substantially minimizing the possibility of erroneous detection of these out-of-band signals.

Individual output tone signals from filters 102-1 through 102-N are supplied via corresponding ones of full wave rectifiers 103-1 through 103-N, respectively, to a first input (+ input terminal) of a corresponding one of comparator circuits 105-1 through 105-N. That is to say, output signals from bandpass filters 102-1 through 102-N are converted to direct current signals and supplied on a one-to-one basis to first inputs of comparator circuits 105-1 through 105-N, respectively.

Variable threshold generation circuit 104 responds to the received multifrequency signal from terminal 101 to dynamically generate a direct current output signal whose amplitude is directly proportional to the magnitude of the received signal. This output signal is variable threshold level signal VTH.

For positive amplitude changes of the envelope of the received signal, circuit 104 makes proportionally equivalent changes in signal VTH at substantially the same rate at which the envelope is changing. This characteristic is commonly called "fast attack". Fast attack of circuit 104 allows variable threshold level signal VTH to resemble or track the envelope of the received signal during periods of positive amplitude change for the received signal. In one example, the time constant associated with fast attack has a value of 10 msec.

For negative amplitude changes of the envelope of the received multifrequency signal, circuit 104 decreases the amplitude of signal VTH by a small, predetermined amount. This small, predetermined decrease causes circuit 104 to exhibit a slow response characteristic commonly referred to as "slow release". The rate of release is sufficiently slow to ensure that the amplitude of transient disturbances from bandpass filter 102-1 through 102-N remains below the variable threshold level set by signal VTH. In one example, the slow release time constant has a value of 100 msec.

Variable threshold signal VTH is supplied to a second input (− input terminal) of each one of comparators 105-1 through 105-N. Comparator circuits 105-1 through 105-N in one embodiment of the invention are time delay comparators. Time delay comparators are especially useful in instances where the input signal (+ input terminal of comparators 105) amplitude drops below the reference threshold level signal (− input terminal of comparators 105) level for short time periods such as several milliseconds. In operation, each time delay comparator 105-1 through 105-N compares corresponding output signals from rectifiers 103-1 through 103-N to variable threshold level signal VTH. When the amplitude of a rectifier output signal is larger than the amplitude of signal VTH, the corresponding comparator pulse output signal becomes active (high level). The comparator pulse output signal remains active until the corresponding rectifier output signal subsists at an amplitude below the level of signal VTH for a prescribed uninterrupted period of time. This is generally called "tone gap bridging" because a time delay comparator generates a continously active output signal indicating uninterrupted presence of a tone signal even though the tone signal amplitude is below the threshold level for less than the prescribed period of time.

Comparator pulse output signals at outputs 106-1 through 106-N are utilized by evaluation or timing validation circuitry (not shown) to determine whether the received signal is a valid multifrequency signal. Typically, an evaluation or timing validation circuit tests whether multifrequency tone signals persist for a prescribed minimum time interval above a reference threshold level and whether two and only two of such multifrequency tone signals are present. This type of circuitry is well known to those of ordinary skill in the art of multifrequency receivers. Exemplary evaluation circuits are described in U.S. Pat. No. 4,227,055 issued to R. L. Hanson on Oct. 7, 1980 and U.S. Pat. No. 4,091,243 issued to A. Mizrahi et al. on May 23, 1978.

Figure 2:
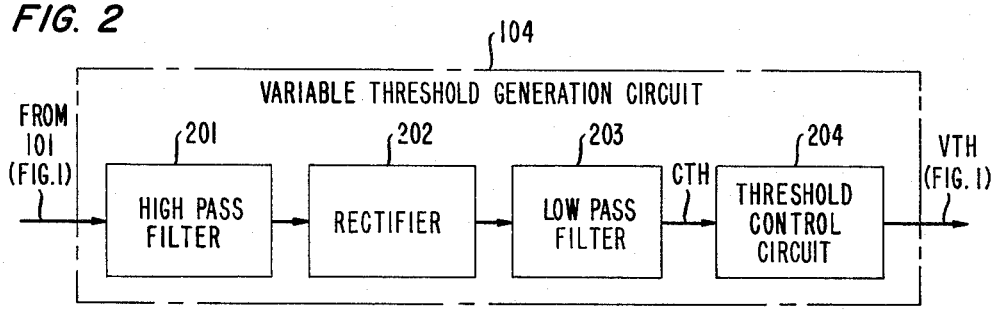
FIG. 2 depicts a simplified block diagram of variable threshold generation circuit 104 from FIG. 1.

FIG. 2 illustrates more detail of variable threshold generation circuit 104 including high pass filter 201, full-wave rectifier 202, low pass filter 203 and threshold control circuit 204. High pass filter 201 responds to the received signal to eliminate low frequency noise therefrom. Low frequency noise is characterized in this situation as direct current noise, power line harmonic energy and the like. In one embodiment, filter 201 is a second order filter section which is well known to those skilled in the art. Rectifier 202 and low pass filter 203 cooperate to produce a stable dc output, signal CTH, in response to the signal output by high pass filter 201. Low pass filter 203, which is a second order filter section having a cutoff frequency at 25 Hz, smoothes the ripple in the output signal of rectifier 202. Clearly, the cutoff frequency and the rolloff characteristic of filter 203 are major factors contributing to the rate of attack.

Signal CTH is supplied to threshold control circuit 204. Threshold control circuit 204 modifies the time response of variable threshold generation circuit 104 to amplitude changes in signal CTH in order to produce a fast attack and a slow release for variable threshold level signal VTH. Signal VTH replicates signal CTH provided that the amplitude of the latter is nondecreasing with time and is greater than a fixed minimum amplitude, signal FIXTH, to be discussed below.

Fast attack is produced by increasing the amplitude of signal VTH to be equal to the amplitude of signal CTH during periods of positive amplitude change for signal CTH, i.e., positive amplitude changes for the envelope of the received signal. Thus, threshold control circuit 204 instantaneously reflects positive amplitude changes of signal CTH into variable threshold signal VTH.

Slow release is produced by decreasing the amplitude of signal VTH by a predetermined small percentage while signal CTH is experiencing negative amplitude changes, i.e., negative amplitude changes for the envelope of the received signal. In one embodiment, the small predetermined percentage is approximately equal to 0.12 percent which is equivalent to a multiplicative factor ($\alpha$, in FIGS. 3 and 5) of 0.9988.

The fast attack and slow release responses employed in threshold control 204 generate a dynamically variable threshold level which allows comparator output signals 106-1 through 106-N to follow more faithfully the transitions of their corresponding multifrequency tone signals. In this way, possible multifrequency detection problems caused by ringing oscillations or other transient disturbances from filters 102-1 through 102-N are substantially eliminated.

Threshold control circuit 204 also includes a fixed limit on the minimum level of variable threshold signal VTH. The use of this fixed lower limit ensures that the multifrequency receiver via comparators 105-1 through 105-N rejects input multifrequency signals whose amplitude is below the limit. In one example, the fixed lower limit is set to a value representing $-33$ dBm/tone signal when terminated with a 600 ohm load.

Figure 3:
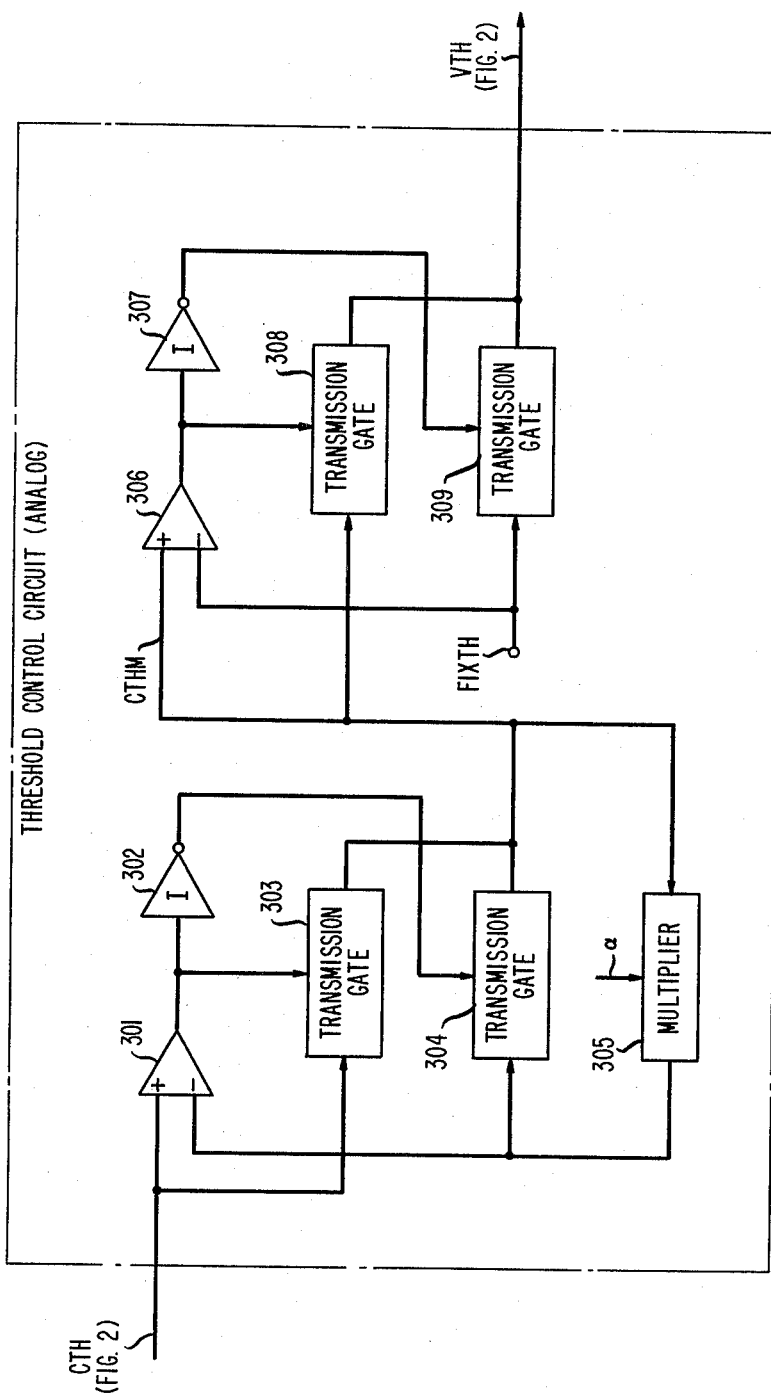
FIG. 3 shows a block diagram of an analog embodiment of a threshold control circuit constructed in accordance with the present invention and useful in the circuit shown in FIG. 2.

FIG. 3 shows a threshold control circuit constructed in accordance with the present invention and useful in implementing circuit 204. Although the threshold control circuit in FIG. 3 is best suited for an analog signal environment, it can also be utilized for digital signals by employing both a digital-to-analog converter at the input terminal (signal CTH) and an analog-to-digital converter at the output terminal (signal VTH).

The threshold control circuit is divided into two major sections: a first section generates signal CTHM while a second section generates variable threshold signal VTH. The first section includes threshold comparator 301, inverter 302, transmission gates 303 and 304, and multiplier 305. Transmission gates 303 and 304 are illustrated as having their respective output terminals wired OR together. The second section of the threshold control circuit includes threshold comparator 306, inverter 307, and transmission gates 308 and 209. Transmission gates 308 and 309 are illustrated as having their output terminals wired OR together. Two constant reference level signals, signal $\alpha$ and signal FIXTH, are employed internally within the threshold control circuit. Signal $\alpha$ controls the release time constant of the threshold control circuit and is set to 0.9988 as a multiplicative factor, for example. Fixed threshold level signal FIXTH has been described above as a lower limit for the amplitude of signal VTH.

In the first section of the threshold control circuit, signal CTH from filter 203 is supplied to an input terminal of the threshold control circuit whereupon it is distributed to comparator 301 and transmission gate 303. Comparator 301 is also supplied with an output signal from multiplier 305 which represents the product of signal $\alpha$ and modified filter output signal CTHM. When the amplitude of signal CTH exceeds the amplitude of the output signal from multiplier 305, comparator 301 is activated to generate a high level output signal. Otherwise, comparator 301 is inactive and generates a low level output signal. The output signal from comparator 301 directly controls the operation of transmission gate 303 and, via inverter 302, also controls the operation of transmission gate 304. For example, a high level output signal from comparator 301 enables transmission path from the input to the output of gate 303 and inhibits transmission on a similar path in gate 304. Accordingly, control circuit signal CTH appears at the output of gate 303 as signal CTHM, which is supplied both to an input of multiplier 305 and to an input of comparator 306. Alternatively, a low level output signal from comparator 301 enables gate 304 and disables gate 303. Thus, modified filter output signal CTHM represents the output signal from multiplier 305.

In the second section of the threshold control circuit, comparator 306 determines whether the amplitude of signal CTHM is greater than the amplitude of fixed threshold level signal FIXTH. When a signal CTHM exceeds level signal FIXTH, comparator 306 generates a high level output signal which enables transmission gate 308 and disables transmission gate 309. For this condition, signal CTHM appears at the output of gate 308 as signal VTH. When signal CTHM does not exceed fixed threshold level FIXTH, comparator 306 generates a low level output signal to disable gate 308 and enable gate 309. Thus, fixed threshold level FIXTH appears at the output of gate 309 as variable threshold signal VTH.

Figure 4:
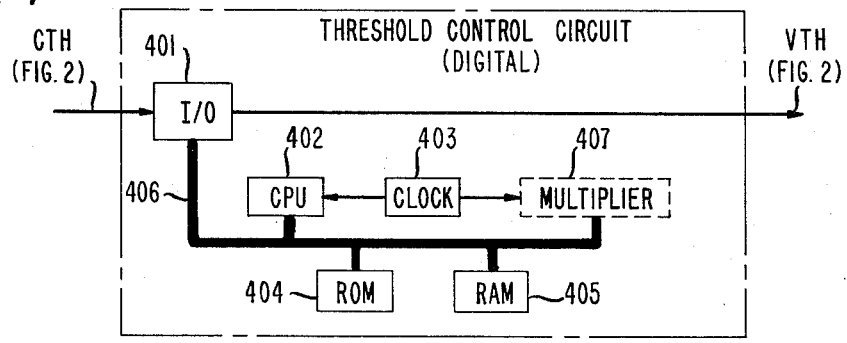
FIG. 4 is a block diagram showing a digital embodiment of a threshold control circuit constructed in accordance with the present invention and useful in the circuit shown in FIG. 2.

FIG. 4 shows in block diagram form a digital embodiment of a threshold control circuit constructed in accordance with the present invention and useful in realizing threshold control circuit 204 shown in FIG. 2. Accordingly, the elements of the threshold control circuit shown are input/output (I/O) 401, central processor unit (CPU) 402, clock circuit 403, read-write memory commonly referred to as random access memory (RAM) 405, read-only memory (ROM) 404 and multiplier 407. CPU 402, RAM 405, ROM 404 and I/O 401 are interconnected via bus 406 to form a so-called microcomputer system. Multiplier 407 is an optional element of the microcomputer system and is interconnected in a peripheral sense via bus 406. Clock 403 supplies timing signals to CPU 402 and multiplier 407.

Any of several arrangements now commercially available may be employed to realize the desired implementation of this digital threshold control circuit. In one exemplary embodiment, an Intel 8085 CPU and associated circuit elements may be employed. This CPU and its operation are described in "MCS 85 User's Manual," published by Intel in March 1977. Programming of the CPU is described in "Intel 8080/85 Assembly Language Programming Manual," dated 1977. It is also noted that a CPU, a ROM, a RAM and an I/O unit are available in a single package as Intel 8048 or its equivalent. Suitable multipliers are manufactured by TRW, for example, a TRW 12×12 bit parallel LSI multiplier MPY-12AJ. The TRW multiplier and its operation are described in a TRW application note on "LSI Multipliers: N×N Bit Parallel Multipliers," March 1977.

Figure 5:
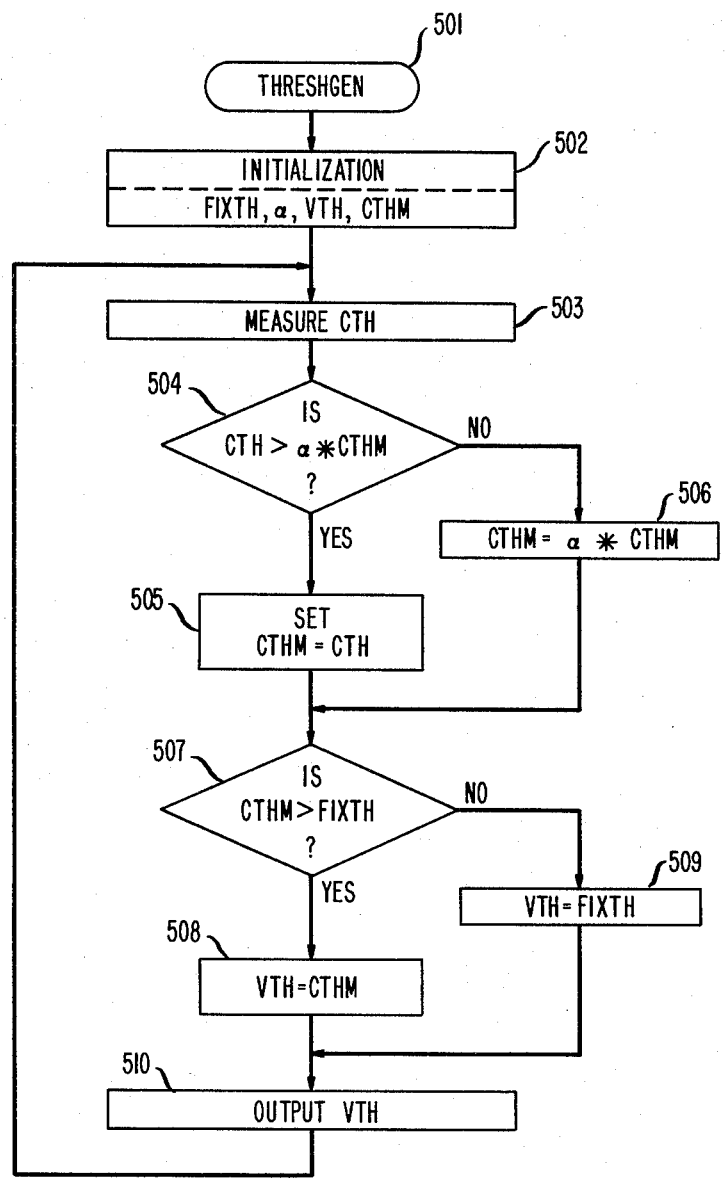
FIG. 5 is a flowchart which illustrates a sequence of steps employed in the embodiment of the present invention shown in FIG. 4 for controllably varying the threshold level in response to the received multifrequency signal.

Operation of the digital threshold control circuit in FIG. 4 in controlling the level of variable threshold signal VTH, in accordance with the invention, is more readily understood with the aid of the flowchart shown in FIG. 5. This flowchart is easily reducible by a person of ordinary skill in the art into a program listing written in an assembly language compatible with CPU 402. Once generated, the program listing serves as a description of a set of electrical control signals which effectively reconfigure the digital threshold control circuit of FIG. 4 into a machine capable of controlling the amplitude of variable threshold signal VTH, in accordance with the invention. Although not as detailed as a program listing, the flowchart provides an orderly and concise explication of the digital threshold control circuit.

The flowchart in FIG. 5 includes three different symbols: an elongate oval, a rectangle and a diamond shape. The elongate oval symbol indicates and signifies the beginning of a routine. The rectangular symbol, commonly referred to as an operational block, contains the description of a particular detailed operational step. The diamond shaped symbol, commonly referred to as a conditional branch point, contains a description of a test performed by the microcomputer system for enabling it to determine the next operation to be performed.

As shown in FIG. 5, the variable threshold level generation (THRESHGEN) routine is entered via oval 501. Operational block 502 indicates that the digital threshold control circuit is to be initialized by clearing specified working registers in each of CPU 402, RAM 405 and multiplier 407 (if used). Fixed threshold signal FIXTH, time constant $\alpha$, variable threshold signal VTH, and modified filter output signal CTHM are loaded into appropriate working registers of CPU 402. An exemplary value of signal FIXTH is set to a number corresponding to received multifrequency signal amplitudes of $-33$ dBm/tone signal. The value of signal $\alpha$ is selected to be slightly less than unity, e.g., 0.9988, thereby controlling the release time constant of the threshold control circuit. Signals VTH and CTHM are both initially set to a value equal to that selected for signal FIXTH. Control is then transferred to operational block 503.

Operational block 503 indicates measurement of signal CTH output from low pass filter 203.

Conditional branch point 504 tests to determine whether the measured amplitude of signal CTH is greater than that for the product of signals $\alpha$ and CTHM. A YES test result causes control to be transferred to operational block 505. A NO test result causes control to be transferred to operational block 506.

Operational block 505 is reached upon a YES result from the test performed at conditional branch point 504. The value of signal CTHM is set equal to the value of signal CTH. Thus, the threshold control circuit operates in a fast attack mode when filter output signal CTH is increasing in amplitude.

Operational block 506, which is reached upon a NO test result from the test in branch point 504, causes the value of signal CTHM to be set equal to the value of the product of signals $\alpha$ and CTHM.

Conditional branch point 507, which is reached along a control path from either block 505 or block 506, tests whether the value of signal CTHM is greater than fixed threshold level signal FIXTH. A YES test result causes control to be transferred to operational block 508 wherein the value of signal VTH is set equal to the value of signal CTHM. A NO test result from branch point 507 causes control to be transferred to operational block 509, wherein the value of signal VTH is set equal to the value of signal FIXTH. This portion of the test causes rejection of received signals whose amplitudes are below a predetermined minimum.

From either block 508 or block 509, control is transferred to operational block 510 causing variable threshold signal VTH to be output via I/O 401 to comparators 105-1 through 105-N. After signal VTH is output, control is transferred to block 503 for reiterating the above-described routine.

In one exemplary embodiment of the microcomputer system in FIG. 4 operating on routine THRESHGEN, clock circuit 403 generates a sufficiently high frequency clock signal to cause routine THRESHGEN to iterate once every 125 $\mu$sec, i.e., an 8 kHz sampling rate on signal CTH. At this sampling rate, the rate of release determined by a value for $\alpha$ equal to 0.9988 is equivalent to a decay time constant of 100 msec.

Threshold control circuit 204 and, more importantly, the multifrequency receiver of FIG. 1, in accordance with the present invention, can be effectively implemented by a person of ordinary skill in the art by appropriately adapting one or more digital signal processors. Such processors are presently in use and include a memory unit, an arithmetic unit, a control unit, an input-output unit and a machine language storage unit in a single VLSI circuit. Alternately, a combination of a number of separate VLSI circuits are interconnected to provide the needed functions.

One device which is suitable for implementing the multifrequency receiver (FIGS. 1–5) of the present invention is a DSP (Digital Signal Processor) manufactured by the Western Electric Co., a corporation of New York, and described, for example, in the following: copending application of J. R. Boddie, R. N. Gadenz and J. S. Thompson (Case 1-1-6), Ser. No. 120,058 filed Feb. 11, 1980; copending application of J. R. Boddie and J. S. Thompson (Case 2-7), Ser. No. 120,059 filed Feb. 11, 1980; and copending application of S. Walters (Case 1), Ser. No. 203,794, filed Nov. 3, 1980.

Another suitable device is a Signal Processing Interface NEC $\mu$ PD7720, manufactured by the Nippon Electric Co. of Japan and marketed by NEC Microcomputers, Inc., Wellesley, Mass. Additionally, American Microsystems, Inc. manufactures a signal processing chip called AMI S2811 Signal Processing Peripheral. A suitable combination of devices can be assembled by combining memory and controller circuits with a MAC-16 (TDC 10 10 J) multiplier-accumulator manufactured and marketed by the TRW Co. of California. The programming of a particular VLSI digital signal processor circuit configuration can be readily performed by a person of ordinary skill in the art of digital signal processor implementations.

What is claimed is:

1. Receiver apparatus (FIG. 1) for detecting the presence of multifrequency signals in a received signal, the apparatus including a plurality of filter means (102-1 through 102-N and 103-1 through 103-N) for separating individual multifrequency tone signals from the received signal, means (104) responsive to the received signal for dynamically generating a reference threshold level (VTH), and a plurality of comparators (105-1 through 105-N) for generating output signals, wherein each output signal is representative of an individual multifrequency tone signal which exceeds the threshold level supplied to the plurality of comparators, each comparator being supplied with the reference threshold level, and being connected to an output of a corresponding filter means, characterized in that the dynamic threshold generating means (104) responds to a positive amplitude change of the envelope of the received signal for increasing, at a first rate, the reference threshold level supplied to the plurality of comparators and responds to a negative amplitude change of the envelope of the received signal for decreasing, at a second rate, the reference threshold level.

2. The apparatus as defined in claim 1 wherein the dynamic threshold generating means includes means responsive to the reference threshold level for inhibiting a decrease of the reference threshold below a predetermined level (FIXTH).

3. The apparatus as defined in claim 2 wherein the first rate is substantially faster than the second rate.

4. Receiver apparatus (FIG. 1) for detecting the presence of multifrequency signals in a received signal, the apparatus including a plurality of filter means (102-1 through 102-N and 103-1 through 103-N) for separating individual multifrequency tone signals from the received signal, means (104) responsive to the received signal for dynamically generating a reference threshold level (VTH), and a plurality of comparators (105-1 through 105-N) for generating output signals, wherein each output signal is representative of an individual multifrequency tone signal which exceeds the threshold level supplied to the plurality of comparators, each comparator being supplied with the reference threshold level and being connected to an output of a corresponding filter means, the dynamic threshold generating means (104) characterized by means (204) responsive to the received signal for controllably increasing the reference threshold level at a first rate when the envelope of the received signal exhibits a positive amplitude change and for controllably decreasing the reference threshold level at a second rate when the envelope of the received signal exhibits a negative amplitude change.

5. The apparatus as defined in claim 4 wherein the means for controllably increasing and decreasing the reference threshold level includes means responsive to the reference threshold level for inhibiting a decrease of the reference threshold below a predetermined level (FIXTH).

6. The apparatus as defined in claim 5 wherein the first rate is substantially faster than the second rate.

7. The apparatus as defined in claim 5 wherein the means for controllably increasing and decreasing the reference threshold level includes computer means (FIG. 4).

8. The apparatus as defined in claim 7 wherein the computer means includes central processing unit (402) having a plurality of working registers, multiplier means (407), clock means (403) for supplying timing signals to the central processor means and to the multiplier means, read/write memory means (405), read-only memory means (404), input/output means (401) and bus means (406) for interconnecting the central processor means, the multiplier means, the read-only memory means and the read/write memory means to each other and to the input/output means.

9. The apparatus as defined in claim 8 wherein a set of instructions is stored in the read-only memory means for causing the computer means to generate the variable reference threshold level by: measuring an amplitude change of the envelope for the received signal, increasing the amplitude of the reference threshold level at a first rate for a positive amplitude change by the envelope of the received signal, and decreasing the amplitude of the reference threshold level at a second rate for a negative amplitude change by the envelope of the received signal.

* * * * *